United States Patent
Blot et al.

(10) Patent No.: US 9,073,272 B2
(45) Date of Patent: Jul. 7, 2015

(54) PROCESS FOR THE PRODUCTION OF A PROFILE MADE OF COMPOSITE MATERIAL FIBERS THAT HAS A HALF-NAIL-HEAD OR NAIL-HEAD CROSS-SECTION

(75) Inventors: Philippe Blot, Nantes (FR); Mathieu Lannuzel, Orvault (FR); Pascal Vinot, Sainte Luce sur Loire (FR)

(73) Assignee: AIRBUS OPERATIONS, SAS, Toulouse (FR)

( * ) Notice: Subject to any disclaimer, the term of this patent is extended or adjusted under 35 U.S.C. 154(b) by 685 days.

(21) Appl. No.: 13/381,446

(22) PCT Filed: Jun. 25, 2010

(86) PCT No.: PCT/FR2010/051314
§ 371 (c)(1),
(2), (4) Date: Jun. 5, 2012

(87) PCT Pub. No.: WO2011/001080
PCT Pub. Date: Jan. 6, 2011

(65) Prior Publication Data
US 2012/0237736 A1   Sep. 20, 2012

(30) Foreign Application Priority Data
Jun. 29, 2009  (FR) ...................... 09 54402

(51) Int. Cl.
*B29C 70/24*  (2006.01)
*B29C 70/52*  (2006.01)
*B29C 70/20*  (2006.01)
*B29L 31/00*  (2006.01)

(52) U.S. Cl.
CPC ......... *B29C 70/52* (2013.01); *Y10T 428/24661* (2015.01); *B29C 70/205* (2013.01); *B29L 2031/003* (2013.01)

(58) Field of Classification Search
CPC . B29C 70/205; B29C 70/52; B26L 2031/003; Y10T 428/24661
USPC ......................................... 425/515, 518, 500
See application file for complete search history.

(56) References Cited

U.S. PATENT DOCUMENTS 4,151,031 A * 4/1979 Goad et al. .................... 156/201

FOREIGN PATENT DOCUMENTS

GB        1146279        3/1969

OTHER PUBLICATIONS

International search report dated Nov. 23, 2010 in corresponding PCT/FR2010/051314.

* cited by examiner

Primary Examiner — Brent O'Hern
(74) Attorney, Agent, or Firm — Young & Thompson

(57) ABSTRACT

A process for the production of a fiber profile (32) that is designed to fill in a space with a nail-head-shaped or half-nail-head-shaped cross-section that originates from the assembly of preforms in a T shape, of which at least one includes a curvature radius at the junction zone of the preforms, includes: supplying powder-coated fibers (28) to a preforming station (30) where the powder is activated and the fibers (28) move into a passage whose shapes are adapted to those of the desired profile, and then making the preformed fibers move into a shaping station (34) where the fiber profile (32) is cooled and shaped by circulating in a cavity whose shapes are adapted to those of the desired profile.

15 Claims, 4 Drawing Sheets

US 9,073,272 B2

PROCESS FOR THE PRODUCTION OF A PROFILE MADE OF COMPOSITE MATERIAL FIBERS THAT HAS A HALF-NAIL-HEAD OR NAIL-HEAD CROSS-SECTION

BACKGROUND OF THE INVENTION

This invention relates to a process for the production of a profile made of composite material fibers that has a half-nail-head or nail-head cross-section. The invention also relates to the device for the implementation of said process as well as the thus obtained profile.

Certain pieces made of composite material are produced from assembled fibrous reinforcement preforms, arranged in a mold and then immersed in a resin matrix.

To obtain a T shape, according to a first embodiment that is illustrated in FIG. 1, three preforms are assembled: a first preform 10 that is called an essentially flat plate, and then two other L-shaped preforms 12, 12' that are arranged symmetrically, each of the L-shaped preforms having a first wing that is flattened against a wing of the other L-shaped preform and a second wing that is flattened against the plate 10. Since, at the junction of the wings, the L-shaped preforms 12, 12' have a more or less significant curvature radius, there is a space 14 that has the shape of a nail head at the junction of the three preforms. In this case, this space 14 has a cross-section with a flat surface and two concave and curved surfaces.

According to another embodiment that is illustrated in FIG. 2, at least three preforms are assembled: a first preform 20 that is called a plate, essentially flat, a second preform 22 that forms the base of the T of which one edge is flattened against the plate 20, and at least a third L-shaped preform 24 whose first wing is flattened against the plate 20, whereby the other wing is flattened against the preform 22. Since, at the junction of the wings, the preform 24 has a more or less significant curvature radius, there is a space that has the shape of a half-nail head 26 at the junction of the preforms 20 to 24. In this case, this space 26 has a cross-section with two flat surfaces and a concave and curved surface.

To ensure the soundness of the material of the piece that results from proper control of the resin injection, the space 14 or 26 should be filled with fibrous reinforcements.

According to one embodiment, an operator forms pre-impregnated or powdered carbon fibers into strands so as to obtain a strand 27 with a circular cross-section. He then positions the strand 27 that is thus produced in the space 14 or 26 using, for example, an adhesive strip, and then he heats it with an iron so that said strand 27 is made integral with the other preforms.

This embodiment is not satisfactory because it does not make it possible to achieve optimized filling of the space 14 or 26, taking into account the essentially circular cross-section of the strand. The unfilled cavities promote the appearance of preferred paths of resin that disturb the filling of the mold and consequently increase the risks of greatly porous zones and/or dry zones.

According to another drawback, as illustrated in FIG. 3, the surrounding sub-preforms of the strand 27 that is used to fill the space 14 or 26 are deformed during the assembly of the preforms or during the closing of the mold, which affects the mechanical characteristics of the thus produced piece because of the undulations of the fibers.

BRIEF SUMMARY OF THE INVENTION

Also, the purpose of this invention is to overcome the drawbacks of the prior art by proposing a process for the production of a composite material profile that has a half-nail-head or nail-head cross-section that makes it possible to optimally fill in a space between the preforms that are assembled in a T shape so as to obtain a composite material piece in order to guarantee the required mechanical characteristics of said composite material piece.

For this purpose, the invention has as its object a process for the production of a fiber profile that is designed to fill in a space with a nail-head-shaped or half-nail-head-shaped cross-section that originates from the assembly of preforms in a T shape, of which at least one comprises a curvature radius at the junction zone of said preforms, characterized in that it consists in supplying powder-coated fibers to a preforming station where said powder is activated and said fibers move into a passage whose shapes are adapted to those of the desired profile, and then in making said preformed fibers move into a shaping station where said fiber profile is cooled and shaped by circulating in a cavity whose shapes are adapted to those of the desired profile.

BRIEF DESCRIPTION OF THE DRAWINGS

Other characteristics and advantages will emerge from the following description of the invention, a description that is provided by way of example only, relative to the accompanying drawings in which.

DESCRIPTION OF PREFERRED EMBODIMENTS

Figure 1:
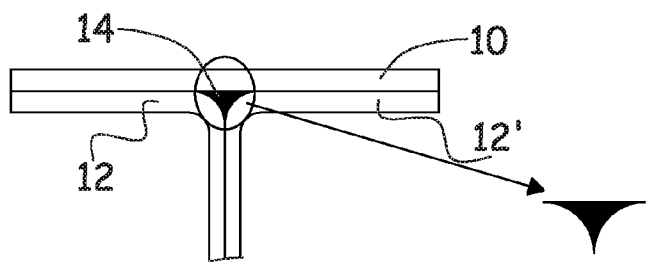
FIG. 1 is a cutaway that illustrates a first variant of assembly of preforms that delimit a space with a nail-head shape.

FIG. 1 shows a first variant of an assembly of preforms that are arranged in the shape of a T, comprising a first preform 10 that is called an essentially flat plate, as well as two other L-shaped preforms 12, 12' that are arranged symmetrically, each of the L-shaped preforms having a first wing that is flattened against a wing of the other L-shaped preform, and a second wing that is flattened against the plate 10. Since, at the junction of the wings, the L-shaped preforms 12, 12' have a more or less significant curvature radius, there is a space 14 that has a nail-head-shaped cross-section at the junction of the three preforms. In this case, this space 14 has a cross-section with a flat surface and two concave and curved surfaces.

Figure 2:
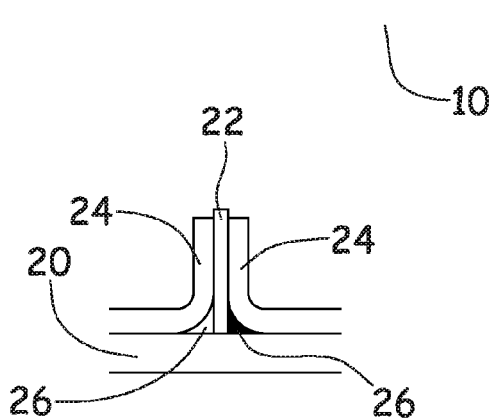
FIG. 2 is a cutaway that illustrates another variant of assembly of preforms delimiting a space with a half-nail-head shape.
Figure 3:
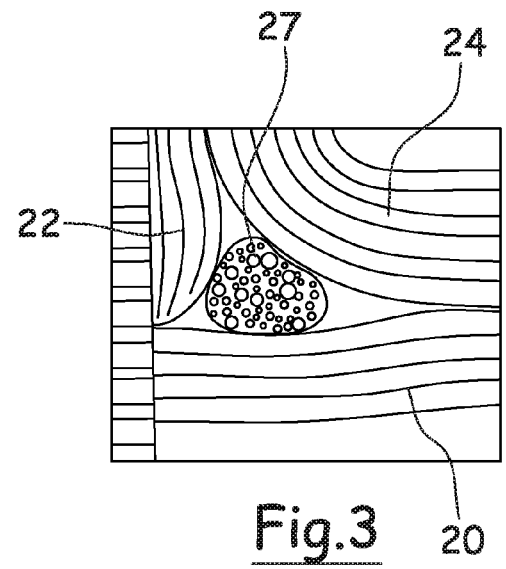
FIG. 3 is a cutaway that illustrates an assembly of preforms with a strand according to the prior art that is used to fill in a space between the preforms as illustrated in FIG. 2.

FIG. 2 shows another variant of an assembly of preforms that are arranged in the shape of a T, comprising a first preform 20 that is called a plate, essentially flat, a second preform 22 that forms the base of the T of which one edge is flattened against the plate 20, and at least a third L-shaped preform 24 of which a first wing is flattened against the plate 20, whereby the other wing is flattened against the preform 22. Since, at the junction of the wings, the preform 24 has a more or less significant curvature radius, there is a space that has a half-nail-head-shaped cross-section 26 at the junction of the preforms 20 to 24. In this case, this space 26 has a cross-section with two flat surfaces and a concave and curved surface.

According to the two variants, at least one of the preforms that are assembled so as to form a T comprises a curvature radius at the junction zone of said preforms.

Figure 4:
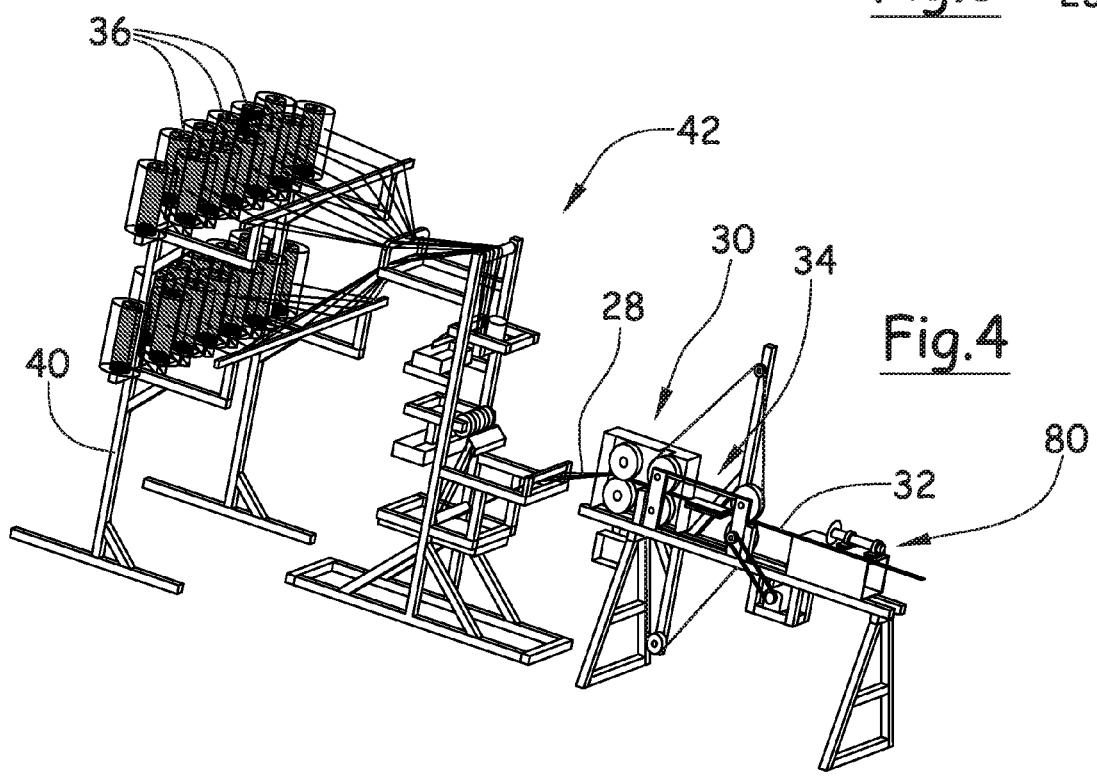
FIG. 4 is a perspective view of a device for producing a fiber profile according to the invention.

FIG. 4 shows a device that makes it possible to produce a fiber profile with a half-nail-head- or nail-head-shaped cross-section according to the invention. This device comprises powder-coated fiber supply means 28, a preforming station 30 at a temperature that is greater than or close to the temperature of use of said powder that makes it possible to obtain a fiber profile 32, and a shaping station 34 that ensures a cooling of the profile 32 to guarantee the required dimensions to said profile.

According to one embodiment, the powdered fiber supply means 28 comprise two parts: a first part that comprises several reels 36 of dry fiber rolls 38 (visible in FIG. 11) that are mounted on a support called a creel 40 as well as a second part that comprises means 42 for powdering dry fibers 38.

Figure 11:
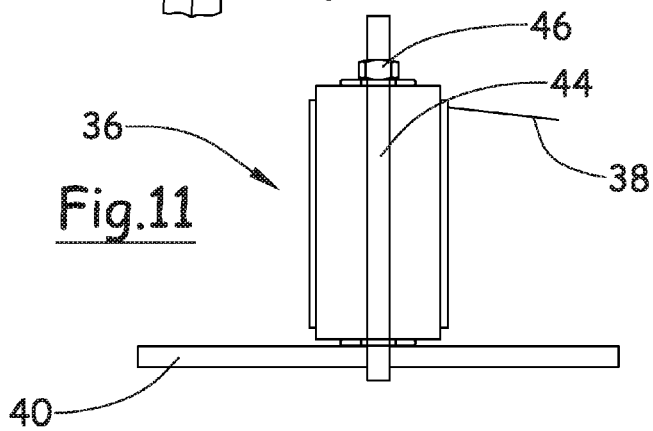
FIG. 11 is a cutaway that illustrates the means for storing and unwinding fibers that are used for producing a fiber profile according to the invention.
Figure 12:
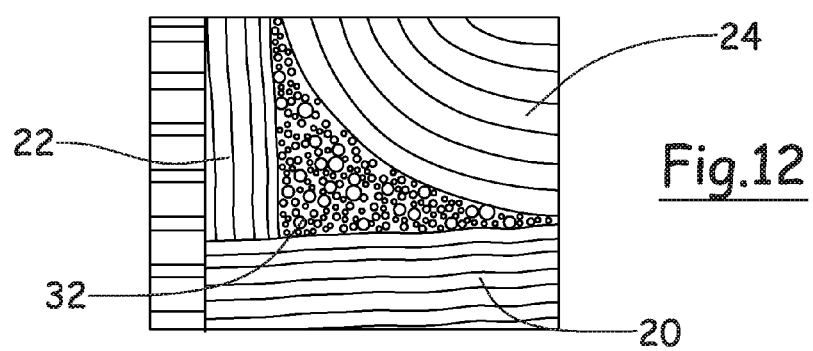
FIG. 12 is a fraction that illustrates an assembly of preforms that integrate a profile with a half-nail-head-shaped cross-section according to the invention.

Preferably, the reel 36 comprises means for adjusting the tension of the fibers to ensure proper operation of the device. According to the example that is illustrated in FIG. 11, the reel 36 comprises an axis of rotation 44 that is fixed on the creel 40 as well as a nut 46 that makes it possible to adjust the tightening of the roll. This tightening makes it possible to prevent the rolls from unwinding in an uncontrolled manner under the action of the weight of the fibers at the output of the roll and to obtain a tension of the fibers in the device. This tension is necessary in particular for ensuring proper operation of the powdering means 42.

Figure 10:
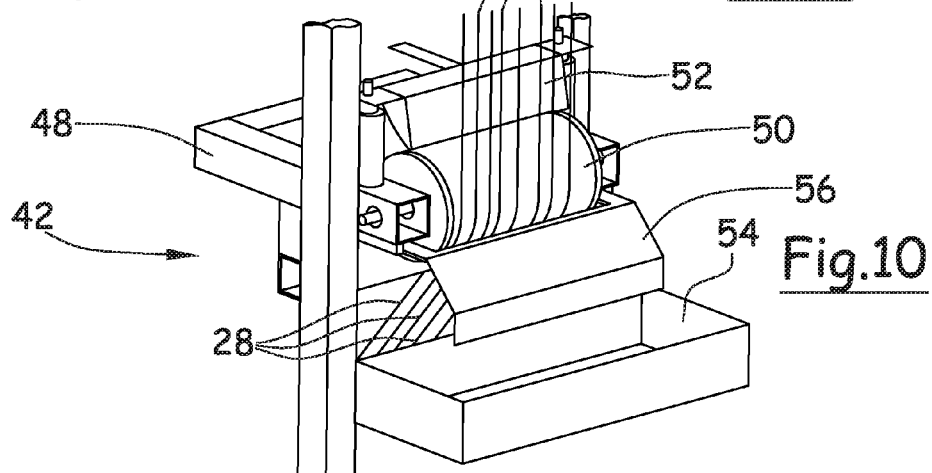
FIG. 10 is a perspective view of the means for powdering fibers that are used to produce a fiber profile according to the invention.

According to one embodiment, the powdering means comprise at least one powdering station that is illustrated in details in FIG. 10. The powdering means can comprise two stations as illustrated in FIG. 4.

This station comprises a powder storage hopper 48, a drum 50 to whose surface the powder is brought by a first scraper 52 and against which the dry fibers 38 are flattened. The powder that has not adhered to the fibers falls into a recovery tank 54. Preferably, a second scraper 56 can be provided for removing excess powder.

By way of example, the powder can be a thermosetting resin powder or a thermoplastic resin powder.

The powdered fibers 28 then penetrate the preforming station 30 comprising means for activating the powder and means for pressing the fibers 28 against one another so as to obtain a fiber profile 32.

According to an embodiment that is illustrated in FIGS. 5, 6, 7A and 7B, the preforming station 30 comprises two rollers 58, 58' whose axes of rotation are arranged perpendicular to the direction of advance of the fibers 28, preferably horizontally.

At its peripheral surface, at least one of the rollers 58, 58' comprises a groove 60 into which the fibers move.

Preferably, the lower roller 58 comprises a groove 60.

The rollers are arranged so that their peripheral surfaces are tangent in order to define a passage 62 whose dimensions are adapted to those of the fiber profile that is to be obtained.

Figures 6, 7A, 7B:
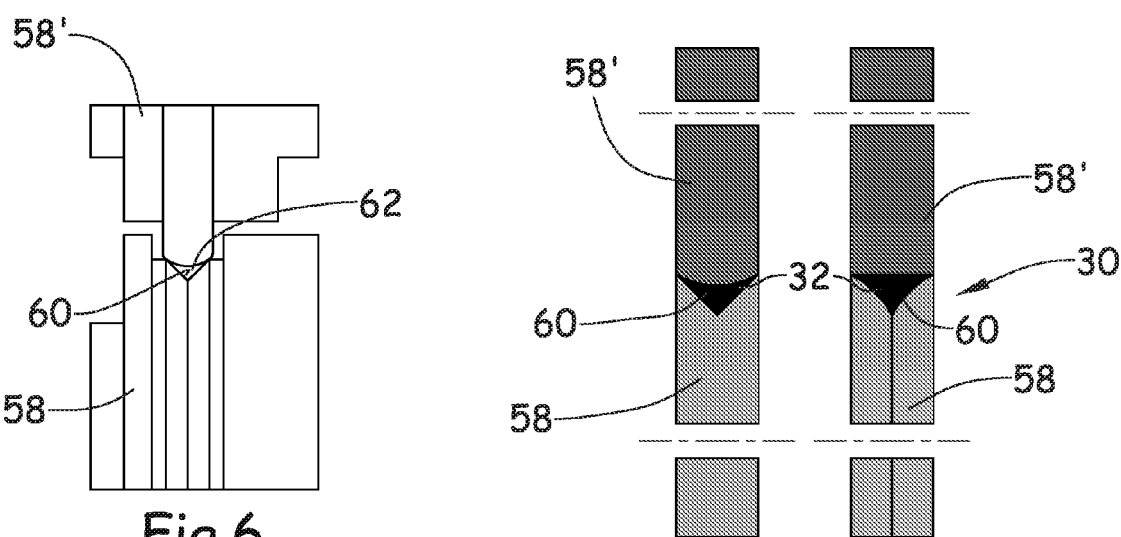
FIG. 6 is a cutaway of the preforming means of the device according to the invention.
FIG. 7A is a diagram of the preforming means according to a first variant of the invention that are suitable for obtaining a profile with a half-nail-head-shaped cross-section.
FIG. 7B is a diagram of the preforming means according to another variant of the invention that are suitable for obtaining a profile with a nail-head-shaped cross-section.

In the case of a fiber profile with a half-nail-head-shaped cross-section as illustrated in FIGS. 6 and 7A, the lower roller 58 has a right-angled V-shaped groove, whereas at its peripheral surface, the upper roller 58' has a convex curved shape that is adapted to the concave and curved shape of the fiber profile that it is desired to obtain.

In the case of a fiber profile with a nail-head-shaped cross-section as illustrated in FIG. 7B, the lower roller 58 has a V-shaped groove with curved and convex wings whose shapes are adapted to the curved and concave shapes of the profile that it is desired to obtain whereas the upper roller 58' has an essentially rectilinear peripheral surface.

According to the variants, means can be provided for extending closer toward the axes of rotation of the rollers 58, 58' so as to exert pressure on the fibers.

According to one embodiment, the activation of the powder is achieved by heating by bringing said powder to a temperature that is greater than or close to its temperature of use. In this case, at least one of the rollers comprises heating means, for example a resistor. As a variant, the rollers 58, 58' can be placed in a chamber and/or means for blowing hot air can be provided for heating the powdered fibers 28.

Figure 5:
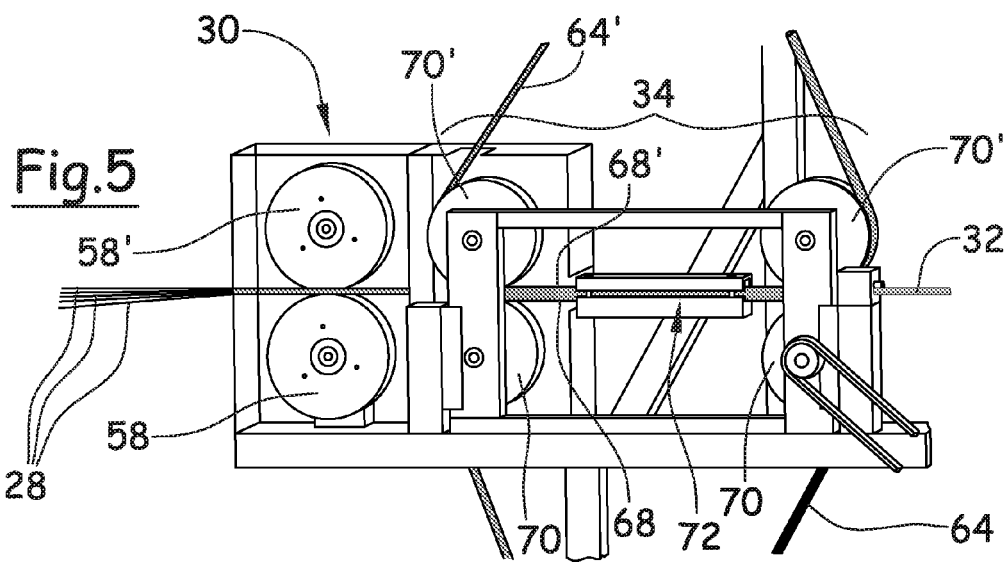
FIG. 5 is a view that illustrates a part of the device of FIG. 4 that allows the preforming and shaping of a fiber profile according to the invention.
Figures 8A, 8B:
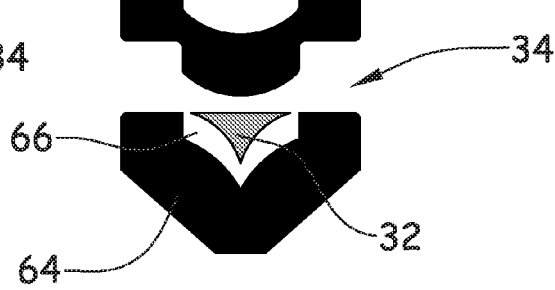
FIG. 8A is a diagram of the shaping means according to a first variant of the invention that are suitable for obtaining a profile with a half-nail-head-shaped cross-section.
FIG. 8B is a diagram of the shaping means according to another variant of the invention that are suitable for obtaining a profile with a nail-head-shaped cross-section.

According to an embodiment that is illustrated in FIGS. 5, 8A and 8B, the shaping station 34 comprises two belts 64, 64' that work with one another so as to define a cavity 66 in which the profile of hot fibers leaving the preforming station 30 is arranged.

The belts 64, 64' each use an essentially rectilinear portion 68, or 68', stretched between two pulleys 70, or 70'.

To the right of these essentially rectilinear portions 68, 68', the belts 64, 64' work together so as to define a cavity 66. Means 72 are provided for flattening the belts 64, 64' against one another so as to exert pressure on the fiber profile so that the rotation of the belts produces the continuous driving of the fibers and the fiber profile in the device.

The shaping station makes it possible to cool the fiber profile and to calibrate it so as to impart to it a cross-section with precise dimensions that are adapted to the space 14 or 26 that is housed between the preforms.

In the case of a profile with a half-nail-head-shaped cross-section as illustrated in FIG. 8A, a belt 64 comprises a cross-section with a hollow right-angled V-shape whereas the other belt 64' comprises a cross-section with a projecting shape with a curved and convex portion that is adapted to the concave and curved shape of the fiber profile that it is desired to obtain.

In the case of a profile with a nail-head-shaped cross-section as illustrated in FIG. 8B, a belt 64 comprises a hollow V-shaped cross-section with curved and convex wings whose shapes are adapted to the curved and concaves shapes of the profile that it is desired to obtain whereas the other belt 64' comprises a cross-section with a flat shape.

Figure 9:
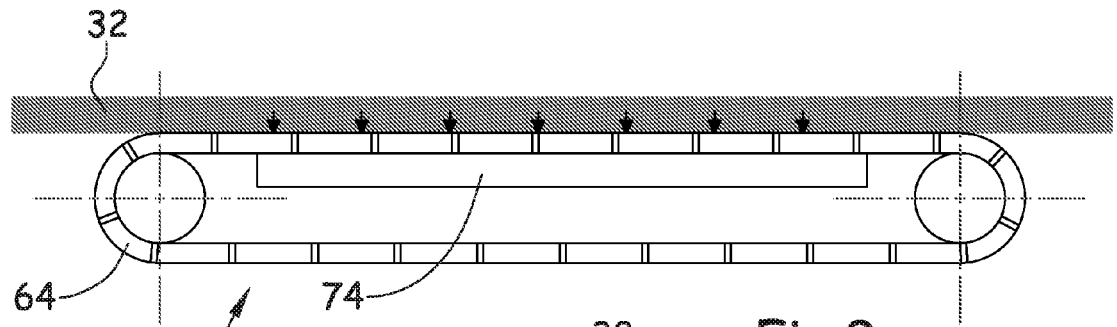
FIG. 9 is a diagram that illustrates another variant of the shaping means.

As appropriate, it is possible to use at least one porous belt 64, 64' that is subjected locally to a negative pressure housed in a chamber 74 so as to improve adhesion to the profile, as illustrated in FIG. 9.

Figure 13:
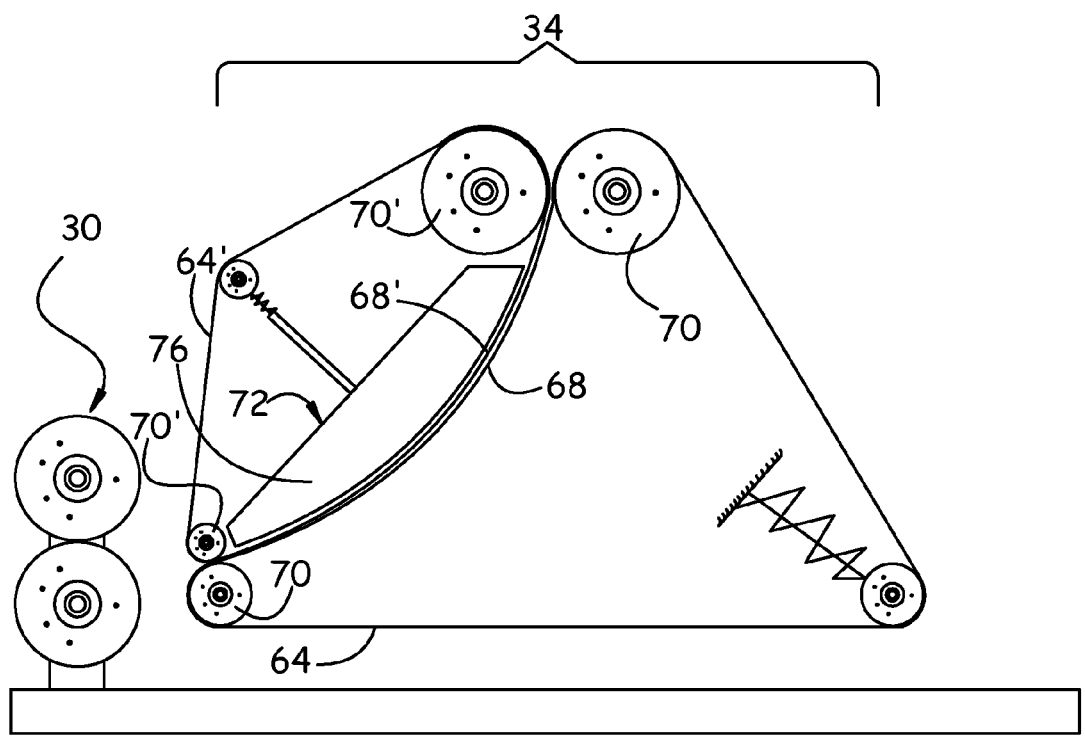
FIG. 13 is a diagram that illustrates another variant of the shaping means that make it possible to obtain a curved profile.
Figure 14:
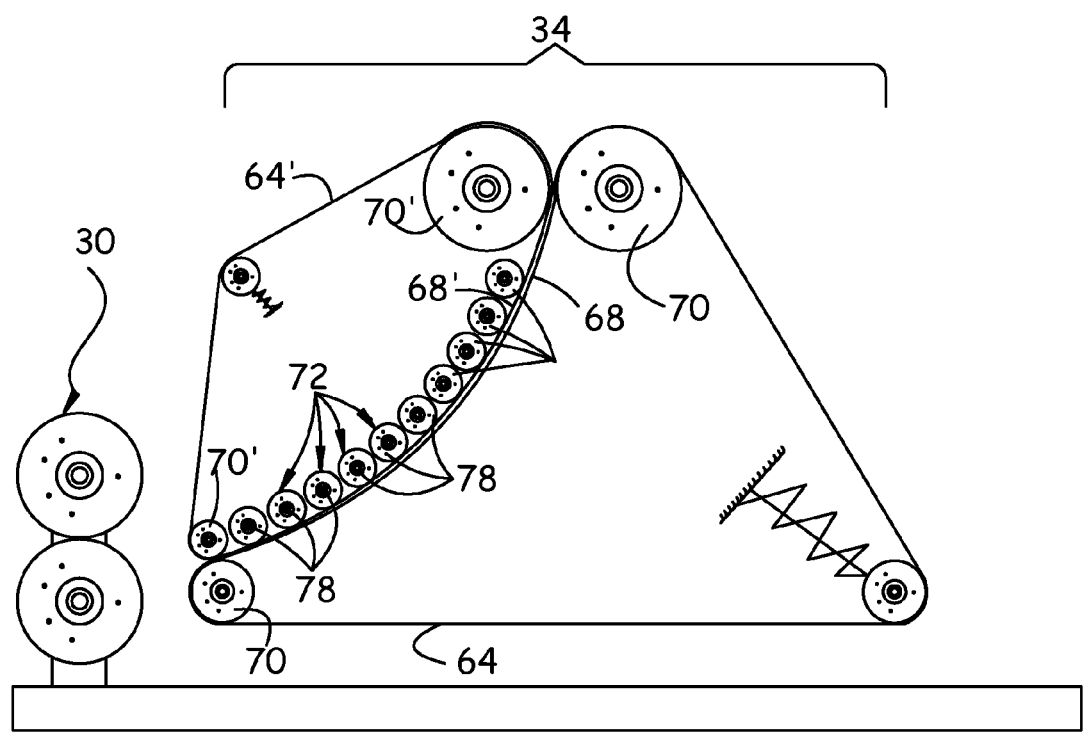
FIG. 14 is a diagram that illustrates another variant of the shaping means that make it possible to obtain a curved profile.

As appropriate, it is possible to obtain a rectilinear profile, as illustrated in FIGS. 5 and 9, or a curved profile as illustrated in FIGS. 13 and 14.

In the case of a curved profile, the shaping station 34 comprises, as above, two belts 64, 64' that work with one another so as to define a cavity 66 in which the hot fiber profile that exits from the preforming station 30 is arranged.

The belts 64, 64' each use a shaping portion 68, or 68', between two pulleys 70, or 70'. Contrary to the variant that is illustrated in FIG. 5, the shaping portions 68, 68' are not rectilinear but curved so as to impart a curved shape to the profile. As for the variant that makes it possible to obtain a rectilinear profile, to the right of the shaping portions 68, 68', the belts 64, 64' work together so as to define a cavity 66. Means 72 are provided to flatten the belts 64, 64' against one another so as to exert pressure on the fiber profile in order that the rotation of the belts produces the continuous driving of the fibers and the fiber profile in the device.

In the case of a curved profile, the belts 64 and 64' are curved in the zone where they work together.

According to a first variant that is illustrated in FIG. 13, the means 72 can come in the form of a friction pad 76 that is made of a material with a low friction coefficient whose surface that is in contact with one of the belts 64, 64' (the belt 64' in FIG. 13) has a shape that is adapted to the desired curvature radius of the profile.

According to another variant that is illustrated in FIG. 14, the means 72 can come in the form of a series of rollers 78 whose pivoting axes are arranged based on the desired curvature radius of the profile.

In addition, the device of the invention can comprise means 80 for cutting the profile, for example, at least one flange for tightening the profile and a rotary disk for slicing it.

The process of the invention makes it possible to obtain a fiber profile whose shapes are perfectly adapted to those of the space originating from the assembly of preforms.

Whereby the space 14 or 26 is perfectly filled in by the fiber profile, the risks of preferred resin paths appearing are reduced, which limits the disturbances during the filling of the mold and consequently the risks of greatly porous zones and/or dry zones.

According to another advantage, whereby the profile has shapes that are perfectly adapted to those of the spaces 14 or 26, the fibers of the preforms that are adjacent to the profile are less disoriented, which also makes it possible to reduce the risks of alterations of the mechanical characteristics of the thus obtained piece.

The invention is not limited to a T-shaped preform but can also be applied to other shapes of preforms, in particular to an I-shaped preform that is equivalent to two T-shaped forms.

The invention claimed is:

1. Device for production of a fiber profile (32) that fills a first space (14, 26) that has a nail-head-shaped or half-nail-head-shaped cross-section that originates from an assembly of preforms (10, 12, 12', 20, 22, 24) in a T shape, of which at least one comprises a curvature radius at a junction zone of said preforms, the device comprising:
   powder-coated fiber supply means (28);
   a preforming station (30) where said powder is activated and where fibers from said fiber supply means (28) move into a passage (62) with a cross-section that corresponds to the cross-section of said first space; and
   a shaping station (34) where said fibers from said passage are cooled and shaped by circulating in a cavity (66) with a cross-section that corresponds to the cross-section of said first space to form said fiber profile,
   wherein the preforming station (30) comprises two rollers (58, 58') whose axes of rotation are arranged perpendicular to the direction of advance of the fibers and so that their peripheral surfaces are tangent, wherein at least one of the two rollers (58, 58') comprises a groove (60) that delimits the passage (62) at its peripheral surface.

2. Device for the production of a fiber profile (32) according to claim 1, wherein said two rollers include a first roller (58) with a right-angled V-shaped groove and a second roller (58') with a convex curved shape at its peripheral surface that corresponds to a respective part of the cross-section of the first space.

3. Device for the production of a fiber profile (32) according to claim 1, wherein said two rollers include a first roller (58) with a V-shaped groove with curved and convex wings whose shapes correspond to respective parts of the cross-section of the first space and a second roller (58') with an essentially rectilinear peripheral surface.

4. Device for the production of a fiber profile (32) according to claim 1, wherein the shaping station (34) comprises two belts (64, 64') that work with one another so as to define the cavity (66).

5. Device for the production of a fiber profile (32) according to claim 2, wherein the shaping station (34) comprises two belts (64, 64') that work with one another so as to define the cavity (66).

6. Device for the production of a fiber profile (32) according to claim 3, wherein the shaping station (34) comprises two belts (64, 64') that work with one another so as to define the cavity (66).

7. Device for the production of a fiber profile (32) that fills a space (14, 26) with a nail-head-shaped or half-nail-head-shaped cross-section that originates from an assembly of preforms (10, 12, 12', 20, 22, 24) in a T shape, of which at least one comprises a curvature radius at a junction zone of said preforms, the device comprising:
   powder-coated fiber supply means (28);
   a preforming station (30) where said powder is activated and where fibers from said fiber supply means (28) move into a passage (62) whose cross-section corresponds to a desired profile; and
   a shaping station (34) where said fibers from said passage are cooled and shaped by circulating in a cavity (66) whose cross-section corresponds to the desired profile,
   wherein the shaping station (34) comprises two belts (64, 64') that work with one another so as to define the cavity (66) in which is arranged a hot fiber profile that exits from the preforming station (30).

8. Device for the production of a fiber profile (32) according to claim 7, wherein a first belt (64) of the two belts has a cross-section with hollow right-angled V-shape and a second belt (64') of the two belts has a cross-section with a projecting shape with a curved and convex portion that corresponds to a respective part of the desired profile.

9. Device for the production of a fiber profile (32) according to claim 7, wherein a first belt (64) of the two belts has a cross-section with a hollow V-shape with curved and convex wings whose shapes correspond to respective parts of the desired profile and a second belt (64') of the two belts has a cross-section with a flat shape.

10. Device for the production of a fiber profile according to claim 7, further comprising means (72) for flattening the two belts (64, 64') against one another in order to exert pressure on the fiber profile.

11. Device for the production of a fiber profile according to claim 7, wherein the two belts (64, 64') are curved in a zone where they work with one another so as to define the cavity (66).

12. Device for the production of a fiber profile according to claim 7, wherein at least one of the two belts (64, 64') is porous and subjected locally to negative pressure housed in a chamber (74).

13. Device for the production of a fiber profile according to claim 8, further comprising means (72) for flattening the two belts (64, 64') against one another in order to exert pressure on the fiber profile.

14. Device for the production of a fiber profile according to claim 11, wherein the two belts (64, 64') are curved in a zone where they work with one another so as to define the cavity (66).

15. Device for the production of a fiber profile according to claim 8, wherein at least one of the two belts (64, 64') is porous and subjected locally to negative pressure housed in a chamber (74).

\* \* \* \* \*